UNITED STATES PATENT OFFICE.

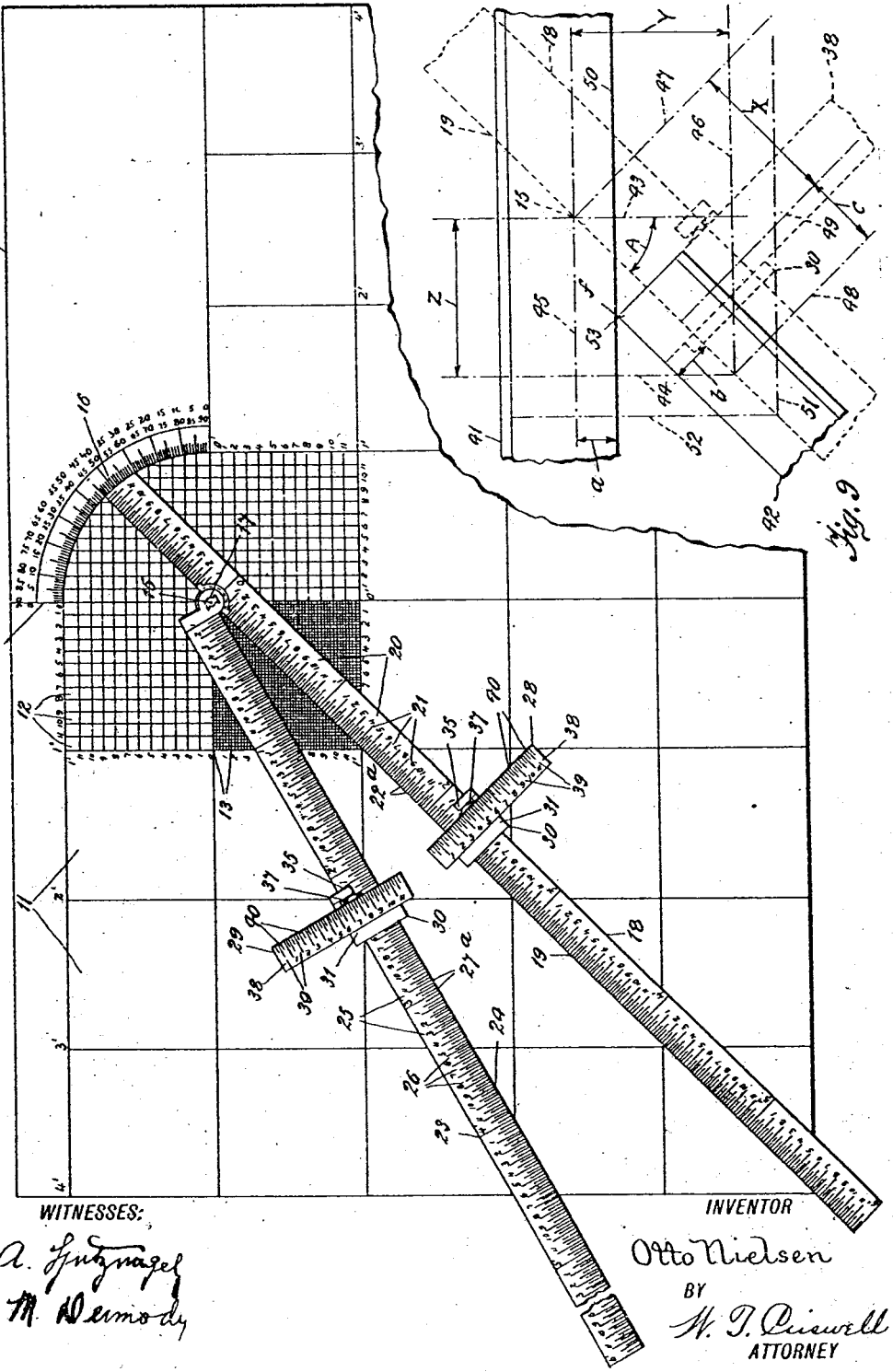

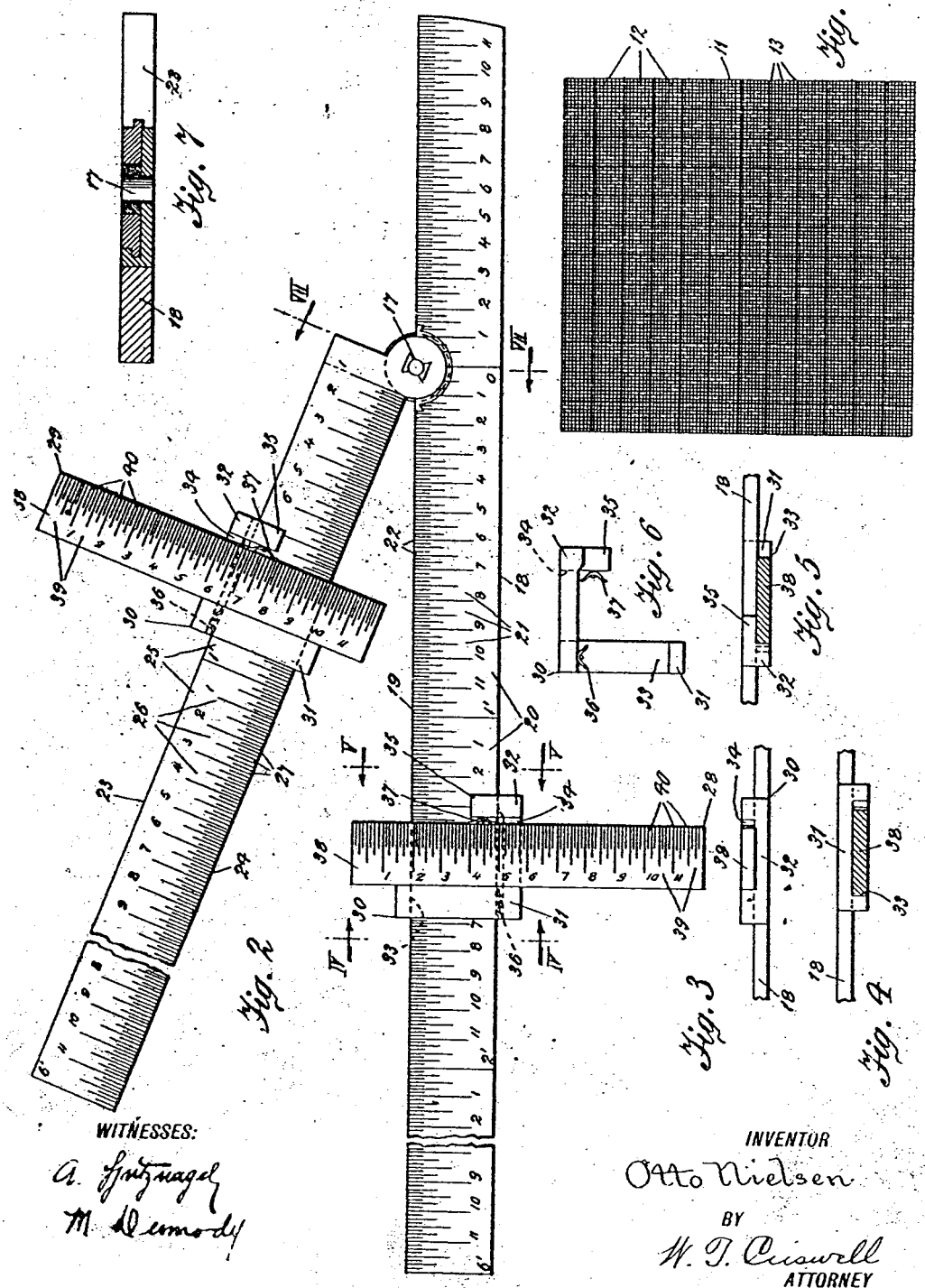

OTTO NIELSEN, OF NEW YORK, N. Y.

COMPUTING AND MEASURING DEVICE.

1,201,334.

Specification of Letters Patent.

Patented Oct. 17, 1916.

Application filed September 14, 1915. Serial No. 50,624.

*To all whom it may concern:*

Be it known that I, OTTO NIELSEN, a subject of the King of Denmark, and a resident of New York, borough of Brooklyn, county of Kings, and State of New York, have invented a certain new and useful Improvement in Computing and Measuring Devices, of which the following is a full, clear, and exact specification.

This invention relates to a class of instruments adapted to be used especially in the work of preparing working plans for erecting structures.

My invention has for its object primarily to provide a device, or instrument designed to be employed for permitting various measurements to be readily determined when the working plans of structures of different classes are being prepared, in order to largely avoid the consumption of time as well as tending to obviate the danger of making mistakes in computing intricate calculations incident at times to this work.

The invention consists essentially of a surface member, or board divided into main divisions, preferably in the forms of squares of determined sizes, and each square division is divided into a given number of subdivisions preferably in the forms of squares each of one-twelfth the size of each of the first square divisions, while each of the square subdivisions is divided into a given number of smaller subdivisions which are also preferably in the forms of squares each of one-eighth the size of each of the subdivisions. On the surface member at the intersection of a number of the square main divisions is a protractor, and pivoted to the surface member at a part centrally of the protractor is a bar, or measuring element arranged so that one of its ends is in movable contact with the protractor, this element having on its exposed surface a scale of divisions each corresponding to the various subdivisions of one of the main divisions of the surface member. On the pivot of the measuring bar is held one end of a second bar, or measuring element also having on its exposed surface a scale of divisions each corresponding to the divisions of the scale of the first measuring bar, and on each of the measuring bars is an adjustable measuring element, adapted to be adjusted on its bar lengthwise as well as transversely thereof. By arranging one or both of the measuring bars on the surface member in a known direction relative to a known point, or measurement, or angle, and by adjusting one, or both of the measuring elements on the bars various calculations and measurements may be readily computed.

A further object of the invention is to provide a computing and measuring device of an efficient and durable construction, and which is susceptible of being made in various sizes.

With these and other objects in view, the invention will be hereinafter more particularly described with reference to the accompanying drawings forming a part of this specification in which similar characters of reference indicate corresponding parts in all the views, and will then be pointed out in the claims at the end of the description.

In the drawings, Figure 1 is a top plan, partly broken away, of one form of computing and measuring device embodying my invention. Fig. 2 is an enlarged top view, parts of which are broken away, of the measuring bars and the adjustable measuring elements used in the device. Fig. 3 is a fragmentary view, showing one end of one of the measuring elements as applied on one of the measuring bars. Fig. 4 is a fragmentary view, partly in section, taken on the line IV—IV of Fig. 2. Fig. 5 is a fragmentary view, partly in section, taken on the line V—V of Fig. 2. Fig. 6 is an inverted plan of one of the slides used in conjunction with each of the measuring elements. Fig. 7 is a section taken on the line VII—VII of Fig. 2. Fig. 8 is an enlarged view of one of the divisions of the surface member of the device, and Fig. 9 illustrates an example of the use of the device for computing measurements.

The computing and measuring device has a surface member, or board 10 which may be made of wood, or any other material in any desired size, and this surface member is preferably substantially rectangular in shape. A suitable portion of the surface member 10 is divided into main divisions of determined sizes each preferably of the dimension of a square foot, as 11, and each of the main divisions is divided into a given number of subdivisions each preferably of one-twelfth the size of each main division, or representing one square inch, as at 12, while each of the subdivisions is divided into a given number of smaller subdivisions each preferably of one-eighth the size of the first subdivisions, or representing one-eighth of a square inch in dimension, as at 13.

On the surface member 10 is a protractor 14 which may be in the form of the quadrant of a circle made of a curved strip of metal, or otherwise provided on the surface member so as to be disposed triangularly with relation to a number of the square main divisions 11, in order to permit the degrees of certain angles to be established, and at a part of the surface member in spaced relation to the center of the protractor, or at a part corresponding to the juncture of the sides of a triangle drawn on lines equivalent to ninety degrees of the protractor is a fixed point, as 15, the degrees of the protractor having the usual scale, as at 16, indicated thereon.

Extending upwardly from the surface member 10 is a pin 17, the axial center of which corresponds to the fixed point 15, and on this pin is pivoted a bar, or measuring element 18 so as to be swung circumferentially on the surface member to various positions. The measuring bar 18 may be of any desired length, and one end of this bar is in movable contact with the protractor 14, while the bar is arranged so that one of its edges, as 19, will be alined with the fixed point 15 at all times during the circumferential movements of the bar as well as to permit this edge of the bar to be registered with the degree marks of the scale 16 of the protractor. On the exposed surface of the measuring bar 17 is a scale composed of main divisions 20 each preferably of one-foot in length, and each main division is divided into subdivisons, as 21, each preferably one-inch in length, while each of the subdivisions, is divided into smaller subdivisions, as 22, each preferably one one-eighth of an inch in length, as shown in Fig. 2, or the subdivisions 22 may be divided into subdivisions of one-quarter of an inch in length, as at 22ª Fig. 1. Also on the pin 17 is pivoted one end of a second bar, or measuring element 23 which is adapted to be swung circumferentially on the surface member 10 toward and from the measuring bar 18. The measuring bar 23 may be of any suitable length, and like the bar 18, this second bar is disposed so that its lengthwise edge, as 24, which is opposed to the edge 19 of the bar 18, will be in alinement with the fixed point 15 of the surface member at all times during the circumferential adjustments of the bar. On the exposed surface of the measuring bar 23 is a scale composed of main divisions 25 each preferably of one-foot in length, and each main division is divided into subdivisions, as 26, each preferably one inch in length, while each of the subdivisions is divided into smaller subdivisions, as 27, each preferably one-eighth of an inch in length, as indicated in Fig. 2, or the subdivisions 26 may be divided in subdivisions of one-quarter of an inch in length, as at 27ª Fig. 1.

On the measuring bars 18 and 23 are adjustable measuring elements, as 28 and 29, respectively, both of which are of similar formations. Each of the measuring elements 28 and 29 has a slide, or supporting plate 30, and each of the slides is substantially L-shaped to provide a longitudinally disposed arm 31 and a vertically disposed arm 32. The underside of the longitudinal arm 31 of each of the slides is transversely grooved, at 33, so that one of the walls of the groove is on alinement with one of the edges of the vertical arm of its respective slide, and each of these grooves is of a length somewhat greater than the width of each of the measuring bars 18 and 23. The top surface of the vertical arm 32 of each of the slides 28 and 29 is also transversely grooved, at 34, so that one of the walls of the groove is on alinement with one of the edges of the longitudinal arm of its respective slide. Extending from the free end of the vertical arm 32 of each of the slides is an extension, or finger 35, and this finger of each slide is disposed in spaced parallel relation with the longitudinal arm of the slide, while the edge of the finger opposed to the longitudinal arm is on alinement with the second wall of the groove 34 of the vertical arm of the slide. Projecting into the groove 33 of the longitudinal arm of each of the slides is a spring 36 which is preferably made of a curved strip of metal having its center secured to one of the end walls of the groove so that its free ends are spaced from this wall of the groove. Extending from the edge of the finger 35 of the vertical arm of each of the slides which is opposed to the longitudinal arm is a spring 37 which is also preferably made of a curved strip of metal having its center fastened to the finger so that the free ends of the spring are spaced from the finger. The slides 28 and 29 are applied on the measuring bars 18 and 23 by disposing the bars in the grooves 33 of the longitudinal arms of the slides in a manner so that the free ends of the springs 36 will contact with the bar for permitting each slide to be movably adjusted lengthwise on each bar, these springs normally serving to yieldingly hold the slides on the bars. The longitudinal arms 31 of the slides will thereby be disposed crosswise on the top surfaces of the measuring bars, and the vertical arm 32 of the slides will be disposed alongside of one of the edges of each bar, while the fingers 35 will be disposed on the top surfaces of the measuring bars transversely thereof, as shown. In the grooves 34 of the vertical arms 32 of the slides, and between the longitudinal arms 31 and the springs 37 of the fingers 35 of the slides, are yieldingly held measuring bars 38 adapted to be adjusted in the slide transversely with respect to the measuring bars 18 and 23. Both of the transversely adjustable measuring bars 38 are preferably one foot in lengths, and each of these adjustable bars is divided into main divisions, as 39, preferably one inch in length, while each of the main divisions is divided into subdivisions, as 40, each of which may be one-eighth of an inch in lengths, as shown in Fig. 2, or these subdivisions may be one-quarter of an inch in lengths, as shown in Fig. 1.

The device as thus formed may be advantageously employed in various ways for permitting measurements to be readily determined when making the working plans for the erection of structures of different classes. For instance, as indicated in the example illustrated in Fig. 9, when it is desired to establish the angle of parts of a trestle having a longitudinally disposed member, as 41, and an angularly disposed member, as 42, and to find the distances of X, Y, and Z, the measuring bar 18 is moved so that its edge 19 will register with the degree 45 of the protractor 14. The angle A being known and the measurements $a$, $b$, $c$, being also known this angle and these measurements are laid out by drawing lines, as 43, 44, 45, 46, 47, 48, 49, 50, 51, 52 in the manner indicated. Then by adjustably sliding the measuring element 38 on the measuring bar 18 toward the fixed point 15 until the corner 53 corresponds with a part, as $f$, the measurement of X is determined, and by adding the measurements of X and $c$ on the scale of the measuring bar of the measuring element 38 the measurements of Y and Z may be readily known by reading the measurements from the divisions of the surface member.

This example is set forth to illustrate the utility of my instrument, and by employing the instrument similarly as occasion may require any person skilled in the art of establishing angles and measurements for the working plans of structures may readily use the instrument to avoid the consumption of the time ordinarily required to compute intricate calculations of this class as well as obviating the danger of making mistakes.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

1. In a computing and measuring device, a surface member divided into square divisions of determined sizes, a protractor on the surface member at the intersection of a number of the divisions, and the juncture of the intersecting divisions providing a fixed point in spaced relation to the central part of the protractor, a pin projecting from the surface member so that its axial center corresponds to the fixed point, a measuring bar pivoted on the pin for being adjustably movable circumferentially on the top of the surface member, the said bar being also arranged so that one of its edges will be retained during the adjustable movements of the bar on alinement with the fixed point as well as having one of its ends in movable contact with the protractor, and the said bar having thereon a scale of divisions each corresponding in length to one side of one of the square divisions of the surface member, and a second measuring bar pivoted on the pin for being adjustably movable circumferentially on the top of the surface member, the said bar being also arranged so that one of its edges will be retained during the adjustable movements thereof on alinement also with the fixed point, and the said second bar having thereon a scale of divisions each corresponding in length to each of the divisions of the first mentioned bar.

2. In a computing and measuring device, a surface member divided into square main divisions of determined sizes, and each main division being divided into a given number of square subdivisions, a protractor on the surface member at the intersection of a number of the main divisions, and the juncture of the intersecting main divisions providing a fixed point in spaced relation to the central part of the protractor, a pin projecting from the surface member so that its axial center corresponds to the fixed point, a measuring bar pivoted on the pin for being adjustably movable circumferentially on the top of the surface member, the said bar being also arranged so that one of its edges will be retained during the adjustable movements of the bar on alinement with the fixed point as well as having one of its ends in movable contact with the protractor, and the said bar having thereon a scale of main divisions each corresponding in length to one side of one of the square main divisions of the surface member, and each main division of the bar being divided into a number of subdivisions each of a length corresponding to the length of one side of one of the surface subdivisions of the surface member, a second measuring bar pivoted on the pin for being adjustably moved circumferentially on the top of the surface member, the said bar being also arranged so that one of its edges will be retained during the adjustable movements thereof on alinement with the fixed point, and the said second bar having thereon a scale of main divisions and subdivisions coresponding to the main divisions and subdivisions of the first mentioned bar, and a measuring element adjustable lengthwise on each of the bars as well as being adjustable transversely of its respective bar, and each of the measuring elements having a scale of divisions each corresponding to the length of each division of each bar.

This specification signed and witnessed this thirteenth day of September A. D. 1915.

OTTO NIELSEN.

Witnesses:
 ROBT. B. ABBOTT,
 M. DERMODY.